Patented June 13, 1939

2,162,376

UNITED STATES PATENT OFFICE 2,162,376

CEREAL PRODUCT AND METHOD OF MAKING THE SAME

Ferdinand A. Collatz, St. Paul, Minn., assignor to General Mills, Inc., a corporation of Delaware No Drawing. Application June 18, 1938, Serial No. 214,569

11 Claims. (Cl. 99—82)

The present invention relates to a cereal product of the ready-to-eat, so-called, breakfast food type, and more particularly to a process of producing such cereal product.

The primary object of my invention is to provide a cereal product having a corn flavor and a delicate, friable structure.

Another object of my invention is to provide a process of producing a cereal product wherein minerals such as calcium and phosphorus may be added to the cereal product without thereby imparting any objectionable flavor to the cereal product.

A further object of my invention is to enhance the nutritional value of a cereal product and to facilitate the manufacture of the product by the addition of wheat germ to such cereal.

These and other objects and advantages of my invention will be readily apparent from a consideration of the following detailed specification in conjunction with the appended claims.

It has heretofore been the practice to produce breakfast-food cereals of certain types by puffing or expanding whole grains of wheat or rice or other grain. Such puffed whole wheat or other grain, however, has certain disadvantages. For example, it is tough and corky in its eating characteristics and it is difficult to flavor such cereal product during the process of manufacture with sugar, salt, or other condiments imparting characteristic flavor.

My invention is based upon the discovery that the above-mentioned difficulties and disadvantages may be substantially obviated by mixing corn meal with other suitable dough-forming ingredients, forming a dough therefrom, cooking said dough at a proper temperature and for a sufficient length of time, forming said dough into pellets, and then expanding the volume of said pellets by subjecting them to heat and high pressure and suddenly discharging the pellets from a confined area of high pressure to an unconfined area of low pressure.

In practicing my invention, I thoroughly mix or blend in a suitable mixing chamber, the following ingredients: Approximately 86 parts of white corn cones (granular endosperm of white corn which has been degerminated), 2.5 parts of yellow corn cones, 3.0 parts of cane sugar, 2.0 parts of salt, 4.5 parts of tapioca flour, 3.0 parts of wheat germ (which has been partially roasted by heating to 140° C. to improve its keeping qualities) and .50 part of a mineral mixture comprising the following ingredients: 17.5%, by weight, of monosodium phosphate, 36.8%, by weight, of disodium phosphate, and 45.7%, of calcium carbonate. The mixture is then fed by suitable means, such as by an automatic feeder, to a cooking chamber, and sufficient water is added thereto to form a dough of the desired consistency.

The dough is mixed while being cooked, at a temperature of about 212° F. After being cooked, the dough is forced from the cooking chamber through an extruding die having a revolving knife operatively associated therewith, and is cut into pellets of appropriate size and length. The pellets are then conveyed to suitable driers of the revolving type so disposed that the pellets are conveyed to the opposite ends of the driers from which they are discharged. The pellets are dried at a controlled rate to provide a pellet having a moisture content of about 11% to 16%, by weight. If the moisture content of the pellets is over 14%, an undesirable white appearance is obtained on the pellets, while if it is less than 11%, a dark-colored product is obtained which will not puff or expand satisfactorily when treated by a subsequent operation.

The pellets, as formed above, are then placed in a suitable closed receptacle or "tempering bin" to permit equalization of moisture content throughout the mass of pellets.

A charge of the pellets, as produced above, is then placed in a suitable revolving retort or "puffing gun" which is heated by any suitable means to a temperature of about 375° F. to 450° F. The retort is then closed by means of a suitable closure member or lid and the retort is rotated at a speed of about 45 revolutions per minute. At the end of about 5½ to 6½ minutes, the pressure in the retort increases to about 80 to 110 pounds per square inch, and the rotation of the retort is stopped, the retort lid is released and the pellets are thereby permitted to expand or puff in size and the puffed pellets are then discharged onto a suitable conveyor. The puffed pellets are then conveyed on a suitable conveyor to a revolving apertured screen or sieve, known in the trade as a "purifier" which serves to classify or separate individual puffed cereal pellets from clumps of such pellets. From the revolving sieve, the pellets are conveyed on a suitable conveyor through a tunnel through which a current of hot air is passed in a counter direction to the direction of passage of the pellets thereby further drying the pellets so that the final product has a moisture content of about 4½% to 6%, by weight.

The cereal pellets are then deposited in a packaging bin from which they may be conveyed to packaging machinery.

The following specific example will serve to illustrate and explain my invention. A mixture of 92 pounds of fine white corn cones, 3 pounds of fine yellow corn meal, 5 pounds of tapioca flour and .3 pound of precipitated calcium carbonate are thoroughly blended in a suitable mixer, preferably provided with a steam jacket. During the blending operation, steam is admitted in the jacket of the mixer in order to preheat the mixture of ingredients until a temperature of 80° C. is reached above the ingredients. While this operation is taking place, 2¼ pounds of sodium chloride, 3 pounds of cane sugar, and a mixture of .1 pound of monosodium phosphate and .2 pound of disodium phosphate are dissolved in 46 pounds of water and heated to a temperature of 80° C. When dry blended ingredients and water have been heated to a temperature of 80° C., the solution is added to the blended ingredients, with continued mixing and a steam pressure is maintained in the jacket of the mixer of 17½ pounds per square inch. The dough attains a temperature of approximately 99° C. in the course of about 20 minutes. When the temperature of 99° C. is attained, the steam pressure in the mixer is reduced to 12½ pounds pressure and maintained at this pressure for 30 minutes. The dough is agitated continuously during this cooking period. After the 30 minutes cooking period, agitation is stopped, the dough is transferred to a press, and extruded through a die, and cut into cylinders of the desired length. The pellets or cylinders are then transferred to a rotary drier. Heated air is introduced into the lower end of the drier which is heated to a temperature of approximately 125° to 130° C. As this air passes through the drier, it dries the pellets, which are in a constant state of agitation due to the rotation of the drum. The pellets on leaving the rotary drier have attained approximately a moisture content ranging between 13 and 15 per cent, by weight.

The cereal in the dried form, as described above, is now ready to puff or expand. A given quantity of the cereal is placed in a hot rotary retort or "puffing gun" which is rotated at a speed of approximately 35-45 revolutions per minute and heated until between 85 and 110 pounds of steam pressure is obtained inside the retort. The heating is then discontinued as well as the rotation of the retort, and the contents of the retort are immediately discharged. This sudden discharge causes these cereal particles to puff or expand in characteristic rounded shapes, having a moisture content between 5% and 6%, by weight.

My improved process is applicable to the treatment of any type of cooked dough. For example, instead of using corn cones or coarsely ground meal, other flours or meals such as those made from wheat, oats, rice or combinations thereof may be used.

The calcium and phosphate compounds used in the dough form a neutral solution therein which imparts the desirable characteristics of both calcium and phosphorus to the dough without thereby imparting any objectionable flavor thereto.

It will, of course, be understood that the composition and amount of ingredients of my cereal product may be varied in numerous ways. For example, the mineral constituents and wheat germ may be omitted if desired, and the resultant product will be a palatable and edible cereal. However, I prefer to use all of the ingredients mentioned above, in order to obtain a cereal having the highest nutritional value as well as the most attractive flavor. Furthermore, the addition of wheat germ has a lubricating effect upon the dough facilitating the mixing operation and substantially preventing the sticking of the pellets to each other after extrusion and cutting and also preventing the pellets from sticking to the puffing gun and other apparatus to any objectionable extent.

My improved process provides a cereal which has an irregular cell structure entirely different from that reported in the prior art (i. e., Anderson patents, U. S. #990,093, and #707,892 wherein raw grains or starches are puffed to produce a regular porous and systematic cell structure in which each cell is enlarged in all directions). In my process, the cooked cereal mixture tends to form a membrane which is stretched or expanded by the water vapor pressure generated during the previously described puffing operation. This cellular structure varies from a hollow sphere at one extreme to numerous small bubbles or blisters at the other.

Corn cereal produced by my process is unique in shape and superior in flavor and eating qualities. It is also a cereal which does not quickly become soggy when cream or milk is added to it before it is eaten.

While the invention has been described in detail with specific examples, such examples are illustrative and are not given as limitations, since other modifications within the spirt and scope of the invention will be apparent to those skilled in the art. Hence, the invention is to be understood as limited only as indicated, in the appended claims, in which the intent is to set forth all the novelty over the prior art.

I claim as my invention:

1. A process of producing an edible cereal product which comprises forming a dough by the addition of water to a farinaceous material, cooking the dough at a temperature approximating the boiling point of water, forming the cooked dough into pellets, drying the pellets to a moisture content substantially within the range of 11% to 16% by weight, subjecting the pellets to a pressure substantially within the range of 80 to 110 pounds per square inch at temperatures substantially within the range of 375° F. to 450° F., suddenly releasing the pressure and thereby permitting the pellets to expand in size, and then drying the expanded product.

2. The process of producing an edible cereal product which comprises forming a dough by the addition of water to a farinaceous material, cooking the dough at a temperature approximating the boiling point of water, forming the dough into pellets, drying the pellets to a moisture content substantially within the range of 11% to 16% by weight, placing the pellets in a closed receptacle for a sufficient length of time to permit equalization of the moisture content throughout the pellets, subjecting the pellets to a pressure substantially within the range of 80 to 100 pounds per square inch at temperatures substantially within the range of 375° F. to 450° F., suddenly releasing the pressure and thereby permitting the pellets to expand in size, and then drying the expanded pellets.

3. A process of producing an edible cereal product which comprises adding a quantity of wheat germ to a farinaceous material, forming a dough by the addition of water to the farinaceous material and wheat germ, cooking the dough at a temperature approximating the boiling point of water, extruding the cooked dough through an apertured die, cutting the extruded dough into desired lengths, drying the extruded material to a moisture content substantially within the range of 11% to 16% by weight, subjecting the extruded material to a pressure substantially within the range of 80 to 100 pounds per square inch at temperatures substantially within the range of 375° F. to 450° F., suddenly releasing the pressure and thereby permitting the extruded material to expand in size, and then drying the product, the quantity of wheat germ added to the farinaceous material being such as to prevent the material from sticking together during the aforesaid operations.

4. An edible cereal product formed from cooked, expanded, farinaceous dough; the product having a fragile vesicular internal structure of high friability; the vesicles thereof varying widely in size and being irregularly distributed; the product also having a friable and relatively dense and hard outer layer which forms a substantially continuous covering.

5. An edible cereal product formed from farinaceous dough which has been cooked at a temperature approximating the boiling point of water and thereafter expanded, the product having a friable vesicular internal structure the vesicles thereof varying widely in size and being irregularly distributed, and having a substantially continuous, friable and relatively dense and hard outer layer which protects the internal structure from mechanical abrasion and breakage.

6. An edible cereal product formed from farinaceous dough which has been cooked at a temperature approximating the boiling point of water and then expanded, the product having a friable vesicular internal structure, the vesicles thereof varying widely in size and being irregularly distributed, and having a friable and relatively dense outer layer which forms a substantially smooth continuous coating which does not readily become soggy when milk or cream is added to it.

7. An edible cereal product formed from farinaceous dough which has been cooked at a temperature approximating the boiling point of water and then expanded, the product having a friable vesicular internal structure, the vesicles thereof varying widely in size and being irregularly distributed, and having a friable and relatively dense and hard outer layer which forms a substantially smooth continuous coating which delays penetration of liquids such as milk and protects the internal structure from mechanical abrasion and breakage.

8. An edible cereal product formed from dough containing tapioca flour and other farinaceous material which has been cooked at a temperature approximating the boiling point of water and then expanded, the product having a friable vesicular internal structure, the vesicles thereof varying widely in size and being irregularly distributed, and having a friable and relatively dense outer layer which forms a substantially smooth continuous coating which delays penetration of liquids such as milk and protects the internal structure from mechanical abrasion and breakage.

9. An edible cereal product formed from dough, the farinaceous ingredients of which are tapioca flour and corn meal, the dough having been cooked at a temperature approximating the boiling point of water and then expanded, the product having a friable vesicular internal structure, the vesicles thereof varying widely in size and being irregularly distributed, and having a friable and relatively dense outer layer which forms a substantially smooth continuous coating which delays penetration of liquids such as milk and protects the internal structure from mechanical abrasion and breakage.

10. A product as described in claim 4 characterized by the presence therein of phosphates and calcium carbonate uniformly distributed throughout the product.

11. A product as described in claim 4 characterized by the presence therein of substantial quantities of calcium carbonate and acidic and basic phosphates of alkali metals in such proportions as to form a neutral mixture and prevent the formation of complex calcium protein compounds.

FERDINAND A. COLLATZ.